(12) United States Patent
Herter et al.

(10) Patent No.: US 8,549,002 B2
(45) Date of Patent: Oct. 1, 2013

(54) CLUSTER HEALTH INDICATOR WITH DYNAMIC LOAD CORRELATION

(75) Inventors: Thomas Herter, Santa Clara, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 780 days.

(21) Appl. No.: 12/152,535

(22) Filed: May 15, 2008

(65) Prior Publication Data

US 2009/0287720 A1    Nov. 19, 2009

(51) Int. Cl.
*G06F 17/30* (2006.01)

(52) U.S. Cl.
USPC ............................ 707/737; 707/802; 707/803

(58) Field of Classification Search
USPC ................................ 707/999.1, 802, 803, 737
See application file for complete search history.

(56) References Cited

U.S. PATENT DOCUMENTS

| | | | |
|---|---|---|---|
| 6,369,819 B1 * | 4/2002 | Pitkow et al. ................. | 345/440 |
| 6,523,036 B1 * | 2/2003 | Hickman et al. .............. | 707/704 |
| 6,643,613 B2 * | 11/2003 | McGee et al. ................. | 702/186 |
| 7,249,315 B2 * | 7/2007 | Moetteli ........................ | 715/234 |
| 7,461,043 B2 * | 12/2008 | Hess .............................. | 706/46 |
| 7,805,446 B2 * | 9/2010 | Potok et al. ................... | 707/737 |
| 7,818,323 B2 * | 10/2010 | Manjrekar et al. ........... | 707/738 |
| 8,219,593 B2 * | 7/2012 | Tunkelang et al. ........... | 707/803 |
| 8,230,346 B2 * | 7/2012 | Ishida et al. ................... | 715/738 |
| 8,261,205 B2 * | 9/2012 | Lee ................................ | 715/784 |
| 2002/0067360 A1 * | 6/2002 | Chi et al. ....................... | 345/441 |
| 2002/0130907 A1 * | 9/2002 | Chi et al. ....................... | 345/853 |
| 2002/0175941 A1 * | 11/2002 | Hand et al. .................... | 345/764 |
| 2003/0084065 A1 * | 5/2003 | Lin et al. ....................... | 707/104.1 |
| 2003/0110007 A1 * | 6/2003 | McGee et al. ................. | 702/179 |
| 2004/0174397 A1 * | 9/2004 | Cereghini et al. ............. | 345/855 |
| 2004/0205726 A1 * | 10/2004 | Chedgey et al. .............. | 717/125 |
| 2007/0150783 A1 * | 6/2007 | Hess .............................. | 714/742 |
| 2007/0299755 A1 * | 12/2007 | Carr ............................... | 705/35 |
| 2008/0104570 A1 * | 5/2008 | Chedgey et al. .............. | 717/105 |
| 2008/0294974 A1 * | 11/2008 | Nurmi et al. .................. | 715/204 |
| 2009/0043797 A1 * | 2/2009 | Dorie et al. .................... | 707/101 |

OTHER PUBLICATIONS

North, Chris, et al., "Visualization Schemas for Flexible Information Visualization", InfoVis '02, IEEE © 2002, pp. 15-22.*
Fang, Xiang, et al., "J3DV: A Java-based 3D Database Visualization Tool", Software: Practice and Experience, vol. 32, Issue 5, Apr. 25, 2002, pp. 443-463.*
Lee, Kukjin, "Uniform Resource Visualization", PhD Dissertation, Iowa State Univ., Ames, IA, © 2006, 146 pages.*

(Continued)

*Primary Examiner* — John E Breene
*Assistant Examiner* — Andalib Lodhi
(74) *Attorney, Agent, or Firm* — Kraguljac Law Group, LLC

(57) ABSTRACT

Systems, methods, and other embodiments associated with producing a proximity display of correlated load metrics associated with members of a cluster are described. One example method includes acquiring metrics data (e.g., load data) from nodes in a cluster. The example method may also include determining a cluster element state based on the metrics data and determining relationships between members of the set of related cluster elements. The method may also include identifying element metric representations for cluster elements based on cluster element states and identifying locations on a proximity display at which element metric representations are to be displayed. The locations may depend on relationships between cluster element states. The method may also include displaying element metric representations at the computed locations to produce a proximity display of correlated load metrics.

20 Claims, 8 Drawing Sheets

(56) References Cited

OTHER PUBLICATIONS

Waters, Christopher, et al., "CluVis: Dual-Domain Visual Exploration of Cluster/Network Metadata", ACMSE 2007, Winston-Salem, NC, Mar. 23-24, 2007, pp. 272-277.*

Massie et al., The ganglia distributed monitoring system, design, implementaion, and experience, Parallel Computing, available online at www.sciencedirect.com, Jun. 15, 2004, pp. 817-840, 2004 Elsevier B.V.

Katz, et al., Wide Area Cluster Monitoring with Ganglia, Cluster Computing, 2003, Proceedings, 2003 IEEE Intl. Conference on . . . , Pub. Date: Dec. 1-4, 2003, pp. 289-298.

* cited by examiner

CLUSTER HEALTH INDICATOR WITH DYNAMIC LOAD CORRELATION

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

A computer cluster may include a set of resources. The resources may include, for example, a processor, a central processing unit(s) (CPU), a memory cache(s), an interconnect(s), a disk(s), an "abstract resource(s)" (e.g., resource modeled in operating system), and so on. These resources may be connected together and may have a complex mesh of dependencies that may change over time. In one example, a cluster may be thought of as a group of independent entities (e.g., servers, resources) that co-operate together as a single logical system. This type of cluster may be used to provide load balancing, high-availability, and so on. An example cluster may include multiple computers, multiple storage devices, and redundant interconnections to form what appears to be a single highly available system. Different resources may independently and asynchronously generate events, take actions, experience loads, consume other resources, experience failures, and so on. Thus, different resources may be monitored and measured using a complex set of metrics that describe performance, availability, and so on. These metrics may be direct measurements including, for example, CPU usage, bandwidth availability, bandwidth consumed, memory usage, cache usage, hard drive usage, and so on. The metrics may also concern more complicated measurements concerning, for example, the size of a queue (e.g., input/output queue), whether the queue is growing, and so on.

Things that are measured tend to be things that are monitored. Thus, systems have developed to report on metrics available for cluster members. Conventional cluster monitoring tools have been single node oriented. However, at least one conventional measurement tool provides a static display of selected sets of metrics for multiple cluster nodes. This conventional tool performs distributed monitoring of clusters and uses a multicast-based listen/announce protocol to monitor state within clusters. The conventional tool may logically federate clusters and aggregate their state based on a tree of point-to-point connections amongst representative cluster nodes. In this conventional approach, a node monitors its own local resources and distributes multicast packets with information concerning those monitored local resources. The multicast packets may be provided to a well-known multicast address periodically and/or upon the occurrence of a predetermined, configurable event.

However, as noted above, conventional tools have provided static displays of selected sets of metrics for cluster nodes. These static displays may be overwhelmed by a system having a large set of nodes and may in turn overwhelm a user trying to understand the provided information or to predict possible deterioration of function. Thus, conventional tools may provide data that is analyzed in a cluster post-mortem. The post-mortem may identify trends and tendencies that may have been difficult to identify while the cluster was still functioning. The difficulty may have arisen due to issues with representation. For example, display space may have quickly been overwhelmed by data associated with a large set of cluster elements (e.g., 100 nodes, 1,000 processes per node, 5,000 disks and interconnections) that provide a large set of measurements (e.g., 10 measurements per element). Also, it may have been difficult to decide what to display and how to group related things, if relationships could even be identified. Conventionally, data may have been displayed using histograms, which may be inappropriate for a data set of the size (e.g., 106 monitored entities) and character described above.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
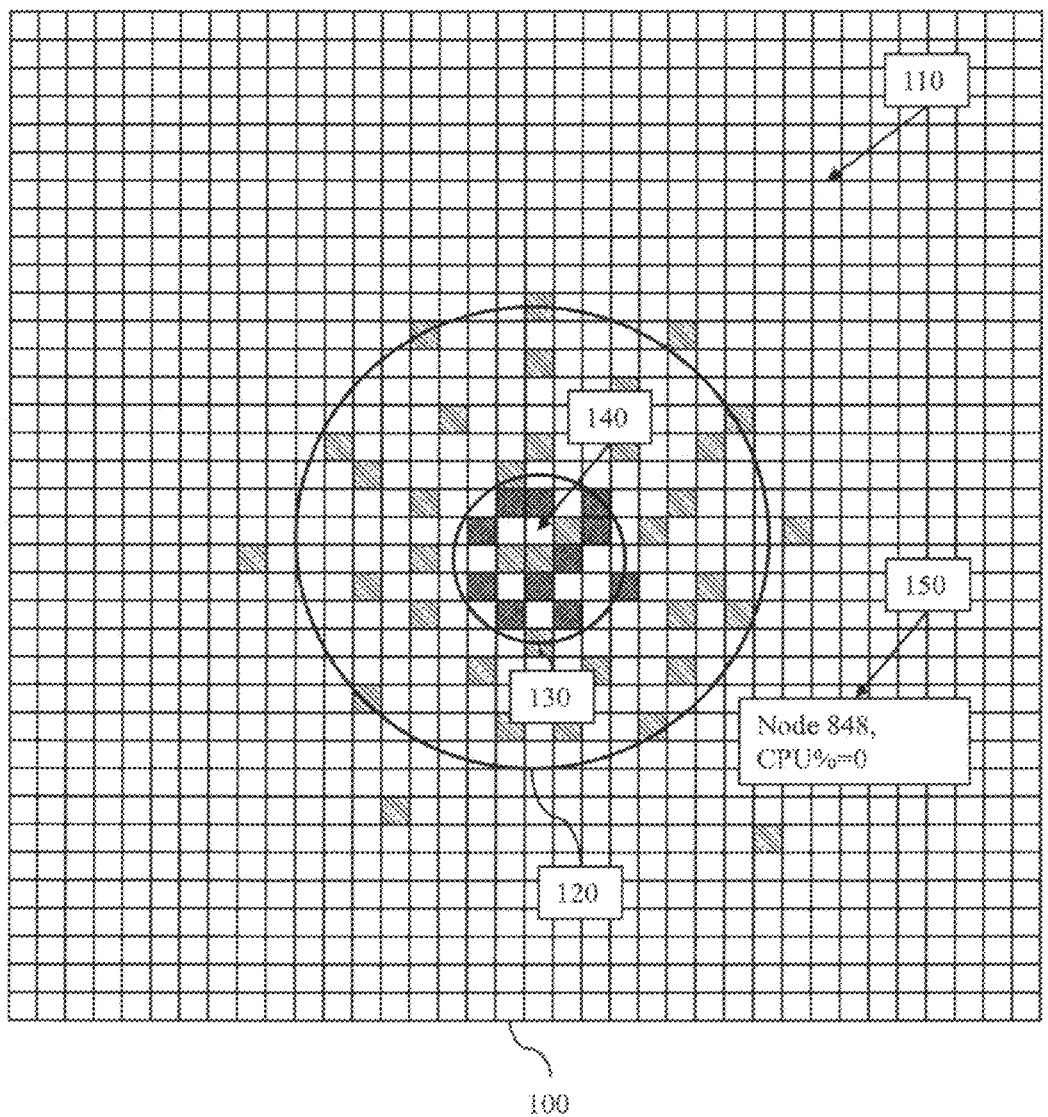
FIG. 1 illustrates a simulated screen shot associated with example proximity display systems and methods described and claimed herein.

Example systems and methods provide a compact cluster health monitor display. The example systems and methods allocate and dynamically change the location of load indicators based on correlations therebetween. Correlated indicators are placed in proximity to each other. Example systems and methods facilitate establishing and maintaining correlations between monitored metrics (e.g., loads) and displaying correlated metrics in proximity to each other to provide graphical overview information about cluster health. In one example, the proximity display of correlated metrics may be displayed on a single physical screen. In another example, the proximity display of correlated metrics may be displayed on a single logical screen that includes a cooperating set of physical screens. Example systems and methods may also allow drilling into a display of correlated load indicators to access data upon which the load indicators are based. Drilled into data may be presented, for example, in histogram form after a portion of the proximity display of correlated metrics has been clicked on.

In one example, the correlated load indicators may be displayed in a "weather radar map" type presentation that indicates the amount and severity of load related issues associated with cluster nodes. Information associated with a set of load related issues may appear as a benign looking (e.g., green, sky blue) background (e.g., sky), a threatening (e.g. yellow, grey) set and/or aggregation of clouds, a frightening (e.g., red, purple, black) concentration of angry looking clouds, and so on. Understanding load severity, load severity density, and relationships between loads at various cluster elements facilitates taking action before a cluster, cluster elements, and/or set of cluster elements experience undesired performance degradation. Thus, example systems and methods may make decisions concerning how and where to display a type and amount of data in a selected format that provides an overview of how many cluster elements are experiencing similar loads, the intensity of those loads, and how the loads relate to each other in the context of the overall cluster.

Thus, in one example, a dynamic proximity display for correlated metrics (e.g., load indicators) is provided. The proximity display may create centers of load on a display to facilitate identifying issues and/or information associated with a clustered system. The information may include, for example, a percent of cluster resources that are under a heavy load and/or failing. The information may also include, for example, a difference in load between a load center(s) and other nodes to illustrate how well a load is balanced. For example, a dense concentration of heavily loaded elements surrounded by a large number of lightly loaded elements may indicate a poor load balancing situation. The information displayed may identify progressive conditions that may require interventions and/or countermeasures. In one example, the proximity display may be operably connected to an alarm logic that will provide a signal concerning an intervention and/or countermeasure. Thus, example systems and methods decide what data to display, where to display it, and how to display it. The what, where, and how decisions may be informed by relations between cluster elements.

Example systems and methods may dynamically allocate different locations on a physical display as indicators for cluster components. The indicators at different physical locations may be relocated at different points in time to correspond to different centers of load. The example systems and methods facilitate specifying a correlation between metrics. In one example, the correlation may be between load metrics. The correlation may be identified and/or maintained based on the topology of a dependency graph. Recall that a dependency graph is a directed acyclic graph representing a dependency relation.

Data associated with the single cluster element may be analyzed with respect to other cluster elements to determine where it is to be displayed. For example, cluster elements experiencing similar loads may be grouped together in different portions of a display and may be arranged closer to or further from the center of a display based on their relationship to loads experienced at other cluster elements. Cluster elements under an unacceptable load may be displayed using an alert color (e.g., red) and may be grouped together in the center of a display while cluster elements experiencing a marginal load may be displayed using a caution color (e.g., yellow) and may be grouped around the nodes experiencing an unacceptable load. Similarly, cluster elements experiencing an acceptable or no load may be displayed using a calming color (e.g., green, sky blue) and may be grouped outside the inner rings. While colors are described, it is to be appreciated that other indicia of load/condition may be employed. For example, shapes, color intensities, motion, motion intensities, and so on, may be used to indicate different load levels and/or conditions.

Similar to how the colors and sizes of storm cells appear on a radar weather map, the color, size and shape of the innermost portion (e.g., inner ring) as compared to the color, size and shape of outermost portions (e.g., outer ring, background) may provide information at-a-glance concerning the size and severity of a load situation in a cluster. Displaying time separated sequences of images facilitates identifying trends like increasing number of cluster elements under load, decreasing number of cluster elements under load, increasing load severity, decreasing load severity, and so on. In one example, the size and/or shape of a previous set of elements having shared characteristics (e.g., heavy load) may be drawn as an outline on a subsequent set of elements.

Since different metrics are available, in one example a display may cycle between maps associated with different metrics. For example, a first map may show correlations between CPU usage metrics, a second map may show correlations between memory usage metrics, a third map may show correlations between bandwidth usage metrics, and a fourth map may show correlations between queue metrics. Thus, a single physical display may provide multiple logical maps that display information about load conditions in a cluster. A portion of a map may be clicked through to reveal information about the data behind the display. Sequences of maps with and/or without superimposed outlines of previous storm clusters facilitate identifying trends.

The acquisition of metrics data and the display of metrics data may be performed by separate logics. The acquisition may be performed by a set of asynchronous reader logics while the display may be performed by a display logic. A reader logic may provide metric data (e.g., load) associated with a cluster element (e.g., node). The data may be analyzed with respect to a configurable adaptive scale associated with that cluster element (e.g., $disk_1$ in $server_1$) and/or with that type of cluster element (e.g., processor, disk). The data may also be analyzed with respect to a transition range experienced by the cluster element. This analysis can inform a determination concerning a property (e.g., load) experienced by the cluster element. The property can be compared to reportable values for a cluster element. The reportable values may include a maximum acceptable value for a metric, a minimum acceptable value for a metric, an acceptable average value for a metric, an acceptable sliding average value for a metric, an acceptable rate of change for a metric, and so on. In one example, the metrics may be added to a list of items, where an item in the list may include a list of metrics. Different items associated with different cluster elements may have different lists of metrics. For example, a first item may be associated with a processor and thus may have a set of metrics associated with processor usage while a second item may be associated with a disk and thus may have a set of metrics associated with disk usage. Therefore, in one example, the list is a heterogeneous list of items having heterogeneous lists of metrics. While a list is described, it is to be appreciated that other data structures (e.g., array, table) may be employed.

Different cluster elements may have different reader logic pulses associated with how frequently data is acquired from the cluster element and provided to the list. The reader logics are to run asynchronously from the proximity display logic. The reader pulse may be configured to be short enough to provide enough data to allow a timely response to changes in cluster health but not so short that excessive system resources are consumed by gathering the metrics data. In one example, reader pulses may be set to read and provide at one second intervals. The proximity display logic may also have a display pulse to control how frequently a display is updated. The display pulse may be associated with human information processing capabilities and may be configurable. In one example, the display pulse may be set to refresh a proximity display at five second intervals, or in a range of between three and ten seconds. One skilled in the art will appreciate that other intervals may be used.

In one example, the display logic is to determine how many centers of activity (e.g. how many storms) to display, and where the center(s) is to be displayed. Determining a center may include identifying the amount of space available to display, identifying the amount of data to display, identifying how much space is available for an individual item to display, and so on. In one example, the display logic may determine the amount of available space (e.g., 1024×720 pixels, 144 square inches), may determine the layout of the available space (e.g., rectangular, square, round), and may identify the physical center of the space in light of the layout. The display logic may also determine how to arrange data associated with different load levels given the amount of available space, the layout of the available space, and the identified center. In one example, the display logic may decide to display two related sets of information as two separate "storms" having two separate centers, sizes, and so on. The decision may be based, for example, on loads being identifiable as being associated with different services, different users, different customers, and so on. To support this type of differentiation, a reader logic may provide not just metric data but also metadata associated with the metric data. The metadata may identify, for example, a service associated with producing the load described by the metric data, a user associated with producing the load described by the metric data, a customer associated with producing the load described by the metric data, and so on.

FIG. 1 illustrates a simulated screen shot 100 associated with example proximity display systems and methods. The majority of screen shot 100 is a blank field 110 of uniform grey shapes. This blank field 110 actually represents a set of individual locations (e.g., pixels) that represent data from individual cluster elements. The cluster elements may be, for example, a process, a piece of hardware, a virtual entity, or, generally, a "monitored entity". In one example, the blank field 110 could be enhanced with a grid (e.g., Cartesian coordinate grid) to facilitate identifying individual elements. A user could drill into a member of the set of individual locations by, for example, clicking on a spot. Clicking on the spot could produce a detail screen (e.g., histogram, raw data report) of data associated with that location. In FIG. 1, clicking into a single spot has produced a textual raw data report 150 that identifies a node (e.g., node 848) and its current metric value (e.g., CPU usage of zero percent).

FIG. 1 also includes an inner region 120 that includes an innermost region 130 and a center 140. Region 120 shows a proximity display of cluster elements that are experiencing a range of loads. Some of the cluster elements in region 120 are experiencing a first acceptable load and are illustrated in the same shape and color as are cluster elements in the blank field 110. Some of the cluster elements in region 120 are experiencing a second acceptable load that is greater than the first acceptable load of elements in the blank field 110 and thus are displayed using a different shade of grey. While a different shade of grey is illustrated, it is to be appreciated that on a color capable display the shades of grey could be different colors. In one example, a color scheme reminiscent of that used in radar weather maps map be employed. Some of the cluster elements in region 120 are experiencing a third load level that is not yet a maximum level but that is of concern and thus are displayed using a third shade of grey. A single cluster element is experiencing an unacceptable load and thus is positioned at center 140 and is illustrated in an alarm shade. The cluster elements that were experiencing the higher and the highest loads are grouped in innermost region 130.

Figure 2:
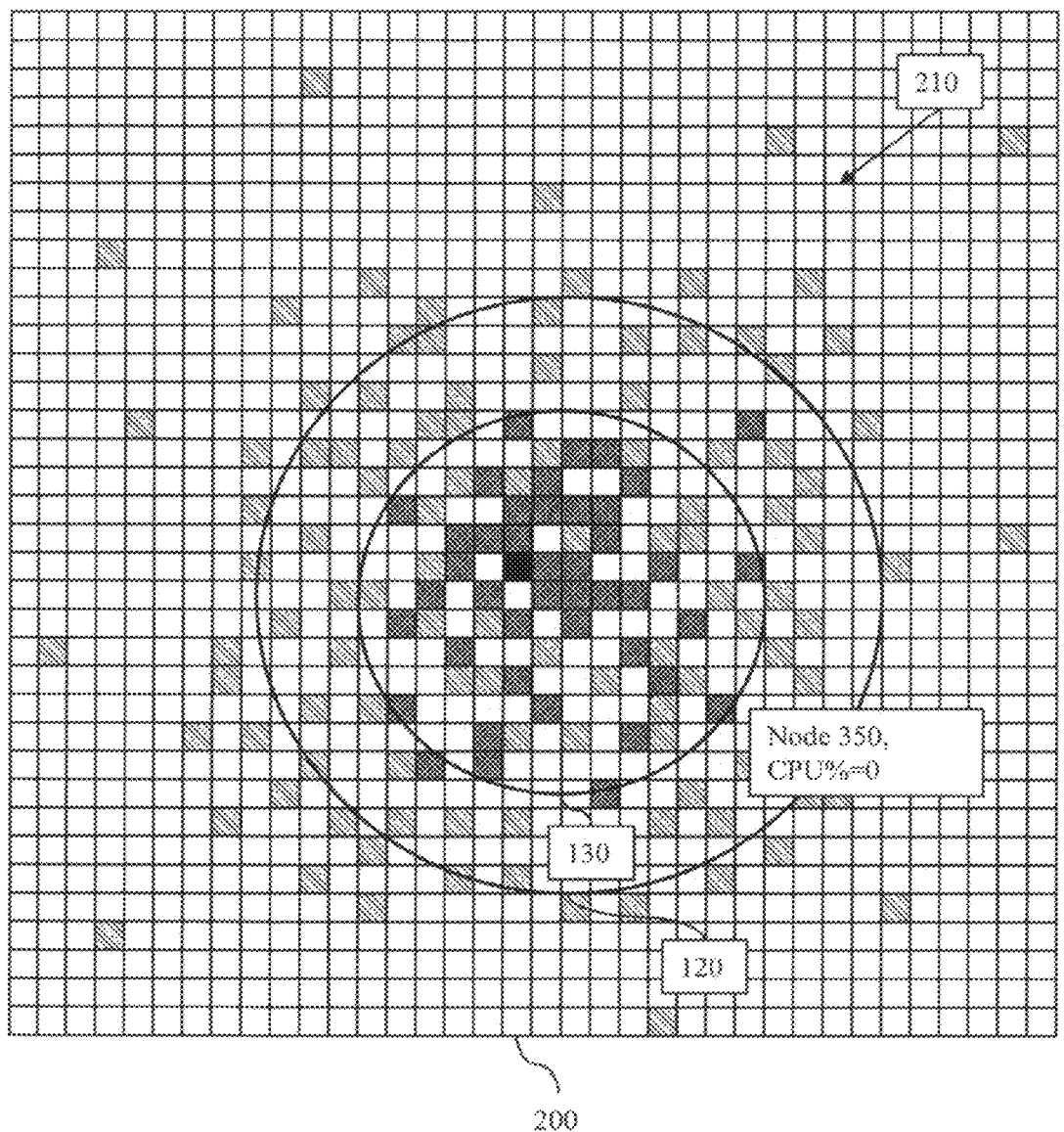
FIG. 2 illustrates a simulated screen shot associated with example proximity display systems and methods described and claimed herein.

FIG. 2 illustrates a simulated screen shot 200 associated with example proximity display systems and methods. Screen shot 200 includes a blank field 210, an inner region 220 and an innermost region 230. However, one look at screen shot 100 (FIG. 1) and screen shot 200 instantly identifies that there are more experiencing an unacceptable load and more items experiencing an elevated load in screen shot 200 than in screen shot 100 (FIG. 1). Some elements that were located in blank field 110 (FIG. 1) may have developed a higher load and may have changed their appearance and migrated towards the inner region 220. Thus, it is to be appreciated that a location on a display may not include information about the same cluster element from display to display. As a cluster element load varies the location where that cluster element is displayed may migrate towards or away from the center of the display. Additionally, since the display is a proximity display, the migration of a first cluster element may cause the migration of a second element(s). For example, if two elements are closely related (e.g., processor, memory, primary memory bus between processor and memory), and if the processor usage has reached a state where it will be migrated towards the center of the display, then data associated with the memory and the primary memory bus may also migrate with the processor. Thus, even at the center of screen shot 200 there are some elements that appear to have an acceptable load. This may be the result of, for example, a processor experiencing an unacceptable load while the memory with which the processor is most closely related is still experiencing an acceptable load.

Figure 3:
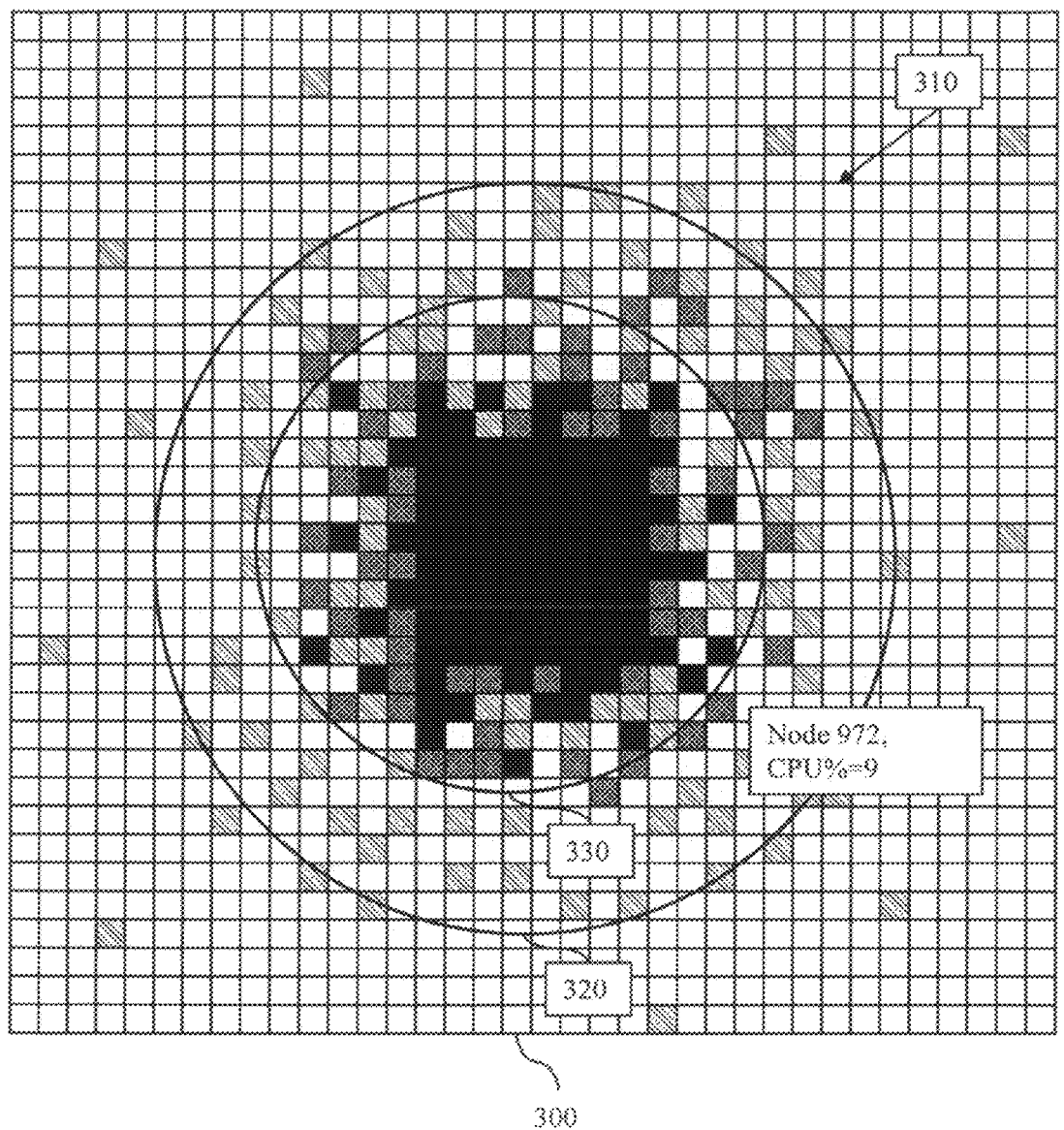
FIG. 3 illustrates a simulated screen shot associated with example proximity display systems and methods described and claimed herein.

FIG. 3 illustrates a simulated screen shot 300 associated with example proximity display systems and methods. In screen shot 300 the blank field 310 is now a backdrop for a noteworthy storm. The center of the display is surrounded by a large and intense innermost region 330 and by a large and intense inner region 320. Once again, a single glance at screen shot 300, especially when compared with screen shot 100 (FIG. 1) and screen shot 200 (FIG. 2), indicates that something noteworthy is happening. A large percentage of cluster elements are simultaneously experiencing an unacceptable load. Additionally, there appear to be few unaffected related resources as the inner region is almost completely filled with resources experiencing an unacceptable load.

To facilitate identifying trends and/or changes, in one example a time series of displays may cycle between screen shot 100 (FIG. 1), screen shot 200 (FIG. 2) and screen shot 300 (FIG. 3). This time series provides visual information concerning the direction in which cluster health is moving and the speed with which it is moving in that direction. In another example, the outline of innermost region 130 (FIG. 1) and innermost region 230 (FIG. 2) may be drawn on screen shot 300. Once again this facilitates providing visual information concerning the direction in which cluster health is moving and the speed with which it is moving.

In one example, a cluster may be associated with real application clusters (RAC) and/or a clustered database. RAC decouples database instances from a database. The instance may be considered to be the processes and memory structures running on a server to allow access to a set of data. The database may be considered to be the physical structures residing on a storage that actually hold data. A clustered database is a single database that can be accessed by multiple instances. Instances may run on separate servers in a cluster and may consume different resources in a cluster. RAC facilitates having multiple computers run database software simultaneously while accessing a single database to provide a clustered database.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and soon.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities.

Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
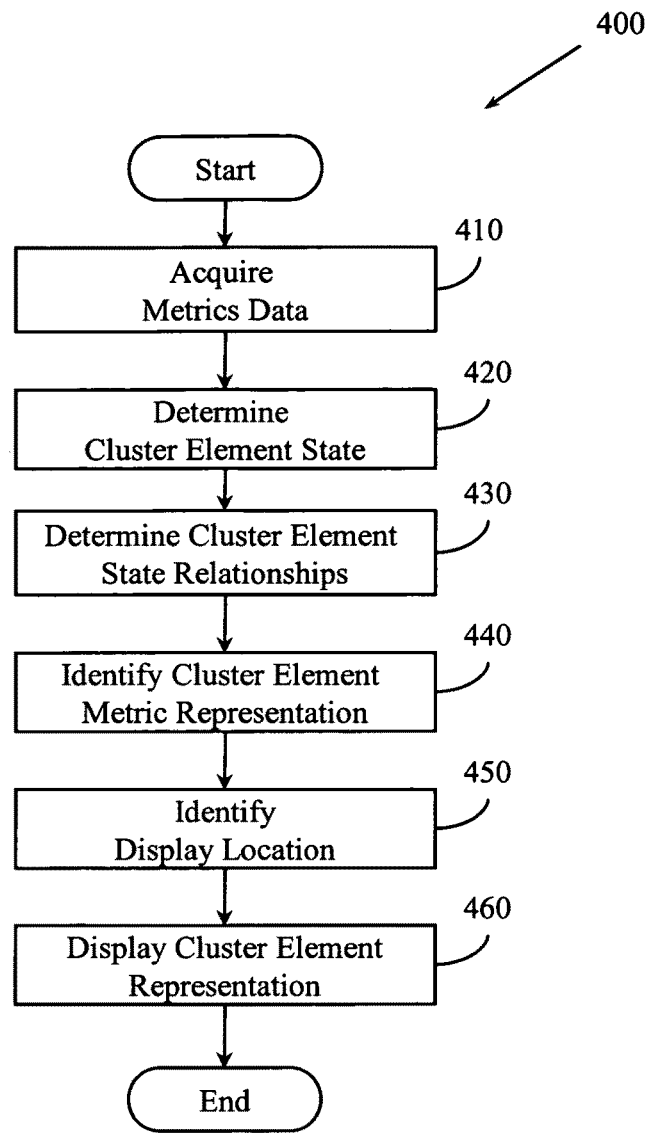
FIG. 4 illustrates an example method associated with indicating cluster health with a dynamic proximity display.

FIG. 4 illustrates a method 400 associated with indicating cluster health with a dynamic proximity display. The proximity display may be, for example, a proximity display of correlated metrics associated with loads experienced by elements in a cluster (e.g., nodes, cluster elements). Method 400 may include, at 410, acquiring sets of metrics data from a set of related cluster elements. Acquiring the data may include reading the data, receiving data packets, receiving files, receiving pointers to data, and so on. In one example, a set of metrics data associated with a cluster element identifies a load experienced by the cluster element. The cluster element may be, for example, a processor, a memory, a disk, a connection, and a queue. Thus, the load may be a processor load, a memory load, and so on. In one example, the sets of metrics data are stored in a dependency graph. In the dependency graph, a single node may store metrics data from an individual cluster element while a branch of nodes may store metrics data from a related group of cluster elements. In one example, membership in the related group of cluster elements is dynamic and depends on a user specified correlation between metrics. For example, a user may specify that metrics associated with a certain processor and metrics associated with a certain memory are to be considered together.

Method 400 may also include, at 420, determining a cluster element state. The state may depend on a set of metrics data associated with the cluster element. As described above, the metrics data may include load data. In one example, determining a cluster element state includes analyzing a set of metrics data associated with the cluster element in light of cluster element metadata associated with the cluster element. The cluster element metadata may include a set of ranges for members of the set of metrics data. The ranges may be associated with cluster element states. The ranges may be dynamic and configurable.

Method 400 may also include, at 430, determining a relationship of the cluster element state to the cluster elements states of other members of the set of related cluster elements. This determination may facilitate determining where on a proximity display to place a cluster element metric representation. For example, a first set of related metrics with a similar load may migrate to a first location while a second set of related metrics with a different load may migrate to a second location.

Method 400 may also include, at 440, identifying a cluster element metric representation based, at least in part, on the cluster element state. In one example, the cluster element metric representation is dynamically configurable with respect to shape, size, color, color intensity, motion, transition, transition rate, and so on. For example, a first cluster element experiencing a first state (e.g., acceptable load) may be represented on a proximity display using a first shape (e.g., square) having a first color (e.g., blue) and a first type of motion (e.g., motionless). However, a second cluster element experiencing a second state (e.g., unacceptable load) may be represented on the proximity display using a second shape (e.g., lightning bolt) having a second color (e.g., silver) and a second type of motion (e.g., blinking). One skilled in the art will recognize that different combinations of shapes, sizes, colors, and attention-getters (e.g., motion, transitions) may be employed in different configurations.

Method 400 may also include, at 450, identifying a location on a proximity display of correlated metrics at which the cluster element metric representation is to be displayed. As described above, the location may depend, at least in part, on the relationship of the cluster element state to the cluster element states of the other cluster members. The location may also depend on the state of the cluster.

Method 400 may also include, at 460, displaying the cluster element metric representation at the identified location on the proximity display. The metrics data may be acquired in real time. Thus, the state of a cluster element may change. Therefore method 400 may include re-determining a cluster element state based on metrics data received after a previous cluster element state determination. With re-determined cluster states available, method 400 may also include periodically refreshing a cluster element metric representation on the proximity display based on the re-determined cluster element state.

While method 400 describes processing associated with a single cluster element and a single cluster element metric representation, it is to be appreciated that a proximity display will include information associated with a large number of cluster elements. Thus, method 400 may be performed for sets of cluster elements.

While FIG. 4 illustrates various actions occurring in serial, it is to be appreciated that various actions illustrated in FIG. 4 could occur substantially in parallel. By way of illustration, a first process could acquire metrics data, a second process could determine cluster element states and relationships, a third process could identify metric representations and locations, and a fourth process could display the representations. While four processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 400. While executable instructions associated with the above method are described as being stored on a computer-readable medium, it is to be appreciated that executable instructions associated with other example methods described herein may also be stored on a computer-readable medium.

Figure 5:
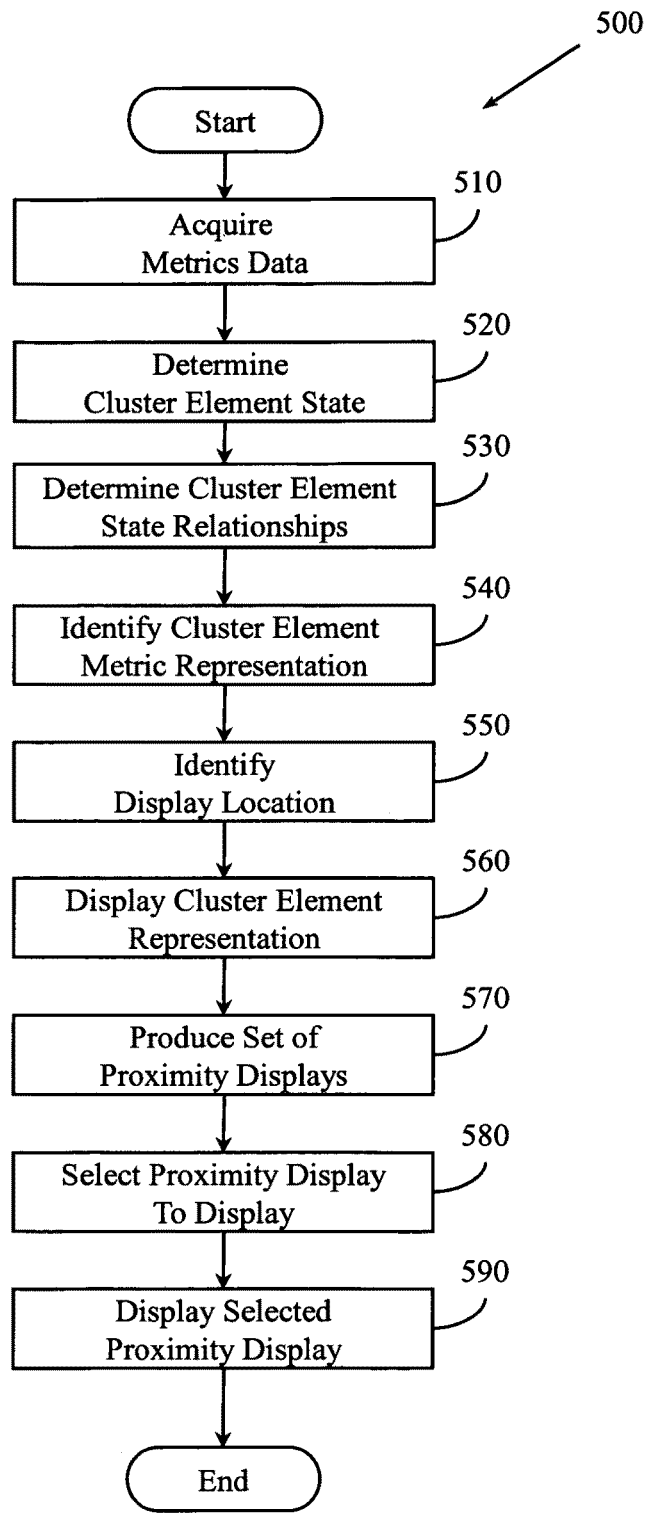
FIG. 5 illustrates another example method associated with indicating cluster health with a dynamic proximity display.

FIG. 5 illustrates a method 500 that includes several actions similar to those described in connection with method 400 (FIG. 4). For example, method 500 includes acquiring metrics data at 510, determining a cluster element state at 520, determining a relationship between cluster element states at 530, identifying a cluster element representation at 540, identifying a location for a cluster element representation at 550, and displaying the representation at 560. However, method 500 includes additional actions.

For example, method 500 includes, at 570, producing a set of proximity displays. The set may include different displays associated with different metrics and/or associated with different users, services, customers, and so on. Thus, members of the proximity displays may be associated with processor load, disk load, memory load, bandwidth, queue size, and so on due to actions associated with different services provided to different customers and/or users. With different displays available, method 500 may include, at 580, selecting which proximity display to display.

Method 500 may also include, at 590, periodically displaying different members of the set of proximity displays. Recall that in one example the members of the set of proximity displays may be related to metrics associated with subsets of the metrics data. In another example, the set of proximity displays may include a time series of proximity maps. Since different maps may be used to display cluster metrics over time, in one example the displaying at 590 may include displaying a representation of a previous grouping of metric representation elements in conjunction with a current grouping of metric representation elements.

In method 500, identifying the display location for a cluster element metric representation at 550 may include computing a logical center for the proximity display. The logical center is the location at which cluster element metric representations associated with a greatest load are to be displayed. In the radar weather map analogy, the center can be considered to be the center of the thunderstorm or hurricane. Computing the logical center of the display may include considering the amount of space available to display the proximity display, different possible shapes for the proximity display, the number of cluster element metric representations to be displayed, the size of the cluster element metric representations to be displayed, and so on. While some examples may display a single storm, other examples may include displaying multiple storms, and thus may include computing multiple logical centers for the proximity display. Different logical centers will be the locations at which cluster element metric representations with greatest loads associated with different users, services, resources, customers, and so on are to be displayed.

Figure 6:
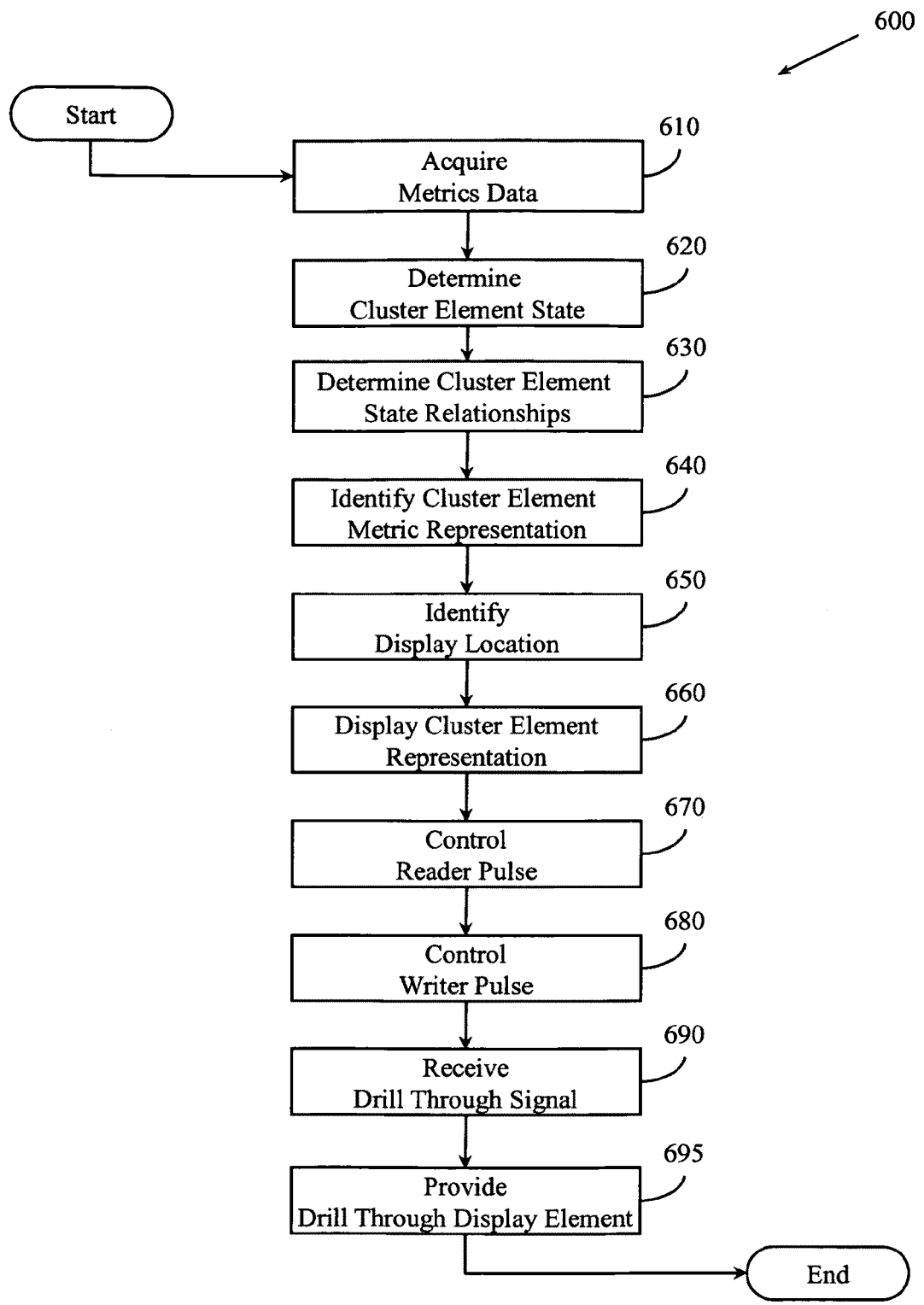
FIG. 6 illustrates another example method associated with indicating cluster health with a dynamic proximity display.

FIG. 6 illustrates a method 600 that includes several actions similar to those described in connection with method 400 (FIG. 4). For example, method 600 includes acquiring metrics data at 610, determining a cluster element state at 620, determining a relationship between cluster element states at 630, identifying a cluster element representation at 640, identifying a location for a cluster element representation at 650, and displaying the representation at 660. However, method 600 includes additional actions.

For example, method 600 includes, at 670, controlling a reader pulse associated with a reader logic that provides members of the sets of metrics data. Method 600 also includes, at 680, controlling a writer pulse associated with a writer logic that provides the proximity display. The reader logic and the writer logic may operate asynchronously and may act to fill and empty a data repository.

The reader logic may include and/or control a large number of reader processes, objects, logics, and so on to acquire data from a large number of cluster elements. The cluster elements may provide data at different intervals and/or using different mechanisms. For example, a first cluster element may provide data periodically while a second cluster element may provide data on an interrupt driven and/or change basis. The cluster elements may provide metrics data and metrics metadata. For example, a device (e.g., disk) may report on its load and may also report information on how to interpret its load. For example, a disk may report that it is 15% full and that no performance degradation occurs until it is 83% full. The reader pulse may control how often a reader logic(s) acquires available data. In one example the reader pulse may be configured to acquire metrics data at 1 Hz. In another example the reader pulse may be configured to acquire metrics data at 10 Hz. One skilled in the art will appreciate that different reader pulses may be associated with different data acquisition patterns and different configurations. In one example the reader pulse may be automatically dynamically updated based on resources (e.g., data storage capacity, processor cycles) available to the system. The writer logic may also have a controllable pulse. This pulse may control how frequently a proximity display is updated, how often proximity maps are cycled through, and so on. In one example the writer pulse may be configured to update a display every three to five seconds. The writer pulse may also be automatically dynamically configurable based, for example, on the degree to which metrics data is changing. If metrics data is changing quickly, then the writer pulse may be increased. But if metrics data is changing slowly, then the writer pulse may be decreased.

Method 600 may also include, at 690, receiving a drill through signal from a system on which the proximity display is displayed. The drill through signal is associated with a cluster element metric representation. The drill through signal may be received in response to a mouse click, to a tap on a touch activated display, to a menu selection, and so on. Method 600 may also include, at 695, selectively providing a drill through display element to provide data upon which the element metric representation is based. The drill through display element may be, for example, a histogram, a text box, a pop up window with further drill through capability, and so on.

Figure 7:
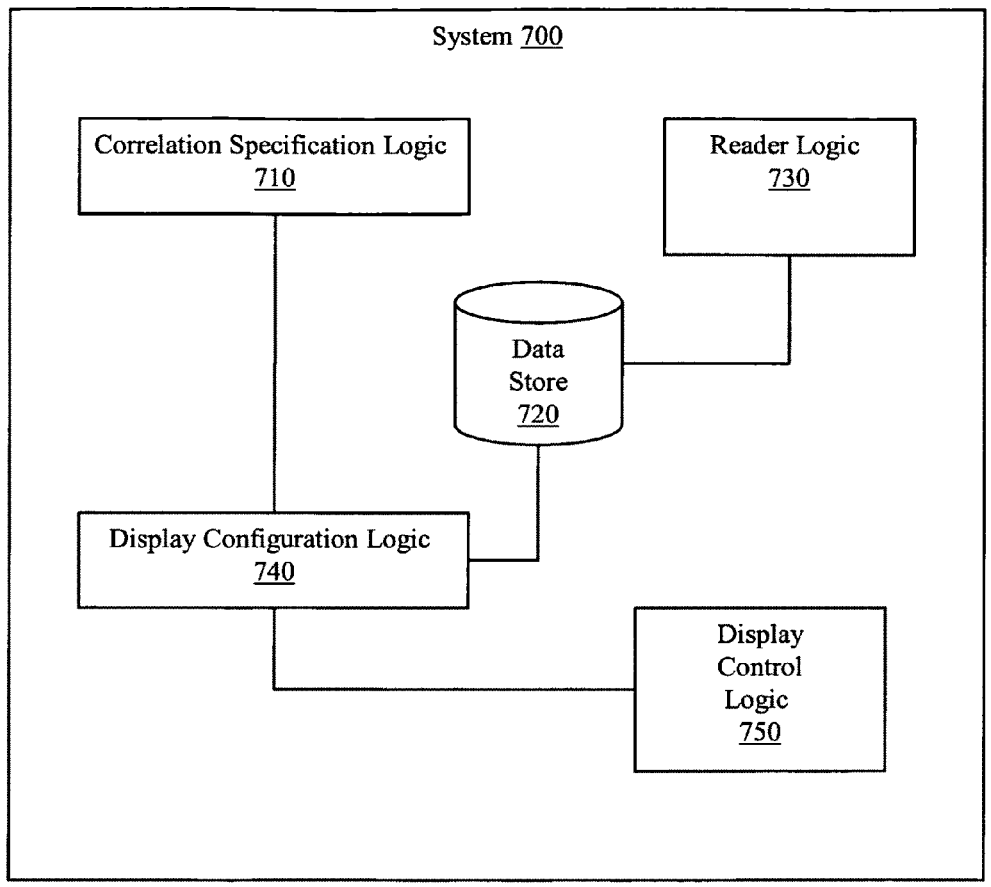
FIG. 7 illustrates an example system associated with indicating cluster health with a dynamic proximity display.

FIG. 7 illustrates a system 700 associated with providing cluster health indications based on dynamic load correlations. System 700 includes a correlation specification logic 710. Correlation specification logic 710 receives data concerning a correlation to be defined between load metrics. The load metrics may be associated with multiple nodes in a cluster. For example, a user may identify a relationship between a processor and a bus and define a correlation between them. Information concerning this correlation may be received by correlation specification logic 710. This information may be used to construct, manage, and/or manipulate a data structure in which metrics data may be stored and organized.

The system 700 may include a data store 720 in which load data associated with nodes in the cluster being monitored by system 700 is stored. The load data may be acquired in real time from the nodes by a reader logic 730. The reader logic 730 may store the load data in a data structure(s) in data store 720. The data structure may be, for example, a dependency graph whose layout is controlled, at least in part, by information received and/or managed by correlation specification logic 710. In one example, the data store 720 is to organize the load data into a heterogeneous list of node entries. A node entry may in turn include a heterogeneous list of metrics data. For example, a processor may be associated with a node entry and a list of processor-centric node metrics may be stored in a list associated with the processor node entry. Similarly, a disk may be associated with another node entry and thus a list of disk-centric node metrics may be stored in a list associated with the disk node entry. While a list is described, it is to be appreciated that data store 720 may organize the load data into other collections.

System 700 also includes a display configuration logic 740. The display configuration logic 740 determines node states representations for display on a proximity display. The node state representations may include different icons, shapes, colors, movement patterns, transitions, and so on. The node state representations are based, at least in part, on the load data and on the load metrics. For example, a first representation may indicate an acceptable load while a second representation may indicate an unacceptable load. A third representation may indicate that a load is increasing while a fourth representation may indicate that a load is decreasing. Thus, a representation for a single node may include a background color (e.g., green, red) that indicates the current load state for the node while the representation also includes a foreground icon (e.g., up arrow, down arrow) that indicates in which direction the load is moving. One skilled in the art will appreciate that other combinations are possible.

In one example, the display configuration logic 740 is to identify an inner region on the proximity display in which a first set of related node state representations are to be displayed. Identifying the inner region may include identifying a center location for a set of correlated load metrics. The display configuration logic 740 may also identify an outer region on the proximity display in which a second set of related node state representations are to be displayed. The first set of related node state representations and the second set of related node state representations may be mutually exclusive and may divide a state space for cluster elements into, for example, elements having and/or associated with an unacceptable load and elements having and/or associated with a deteriorating yet still acceptable load. The display configuration logic may also identify a field region on the proximity display in which a third set of node state representations are to be displayed. The field region may be associated with cluster elements falling into neither the first nor second set of elements.

System 700 also includes a display control logic 750. The display control logic 750 displays a proximity display of correlated load metrics as represented by node state representations. The display control logic 750 selects a location where a representation of a node is to be displayed. This location may depend, at least in part, on a defined correlation between load metrics. This defined correlation may have been identified using correlation specification logic 710. The location may also depend, at least in part, on a discovered correlation between load metrics. The correlation may have been discovered over time as reader logic 730 stores data in data store 720 and display configuration logic 740 analyzes that data. For example, a correlation may be identified that indicates that the loads on a certain processor and a certain memory are directly proportional while another correlation may be identified that indicates that the loads on a certain memory and a certain queue are inversely proportional.

In one example, the display control logic 750 periodically refreshes the proximity display using re-determined node state representation locations. Recall that reader logic 730 may substantially continuously receive load data. Thus data store 720 may substantially continuously reorganize load data. Display configuration logic 740 may therefore substantially continuously re-compute node state representations and node state representation locations. In one example, the display control logic 750 is to display a drill-through data upon detecting a user interaction with a portion of the proximity display. The user interaction may be, for example, a mouse click, a finger touch, a voice command, and so on.

Figure 8:
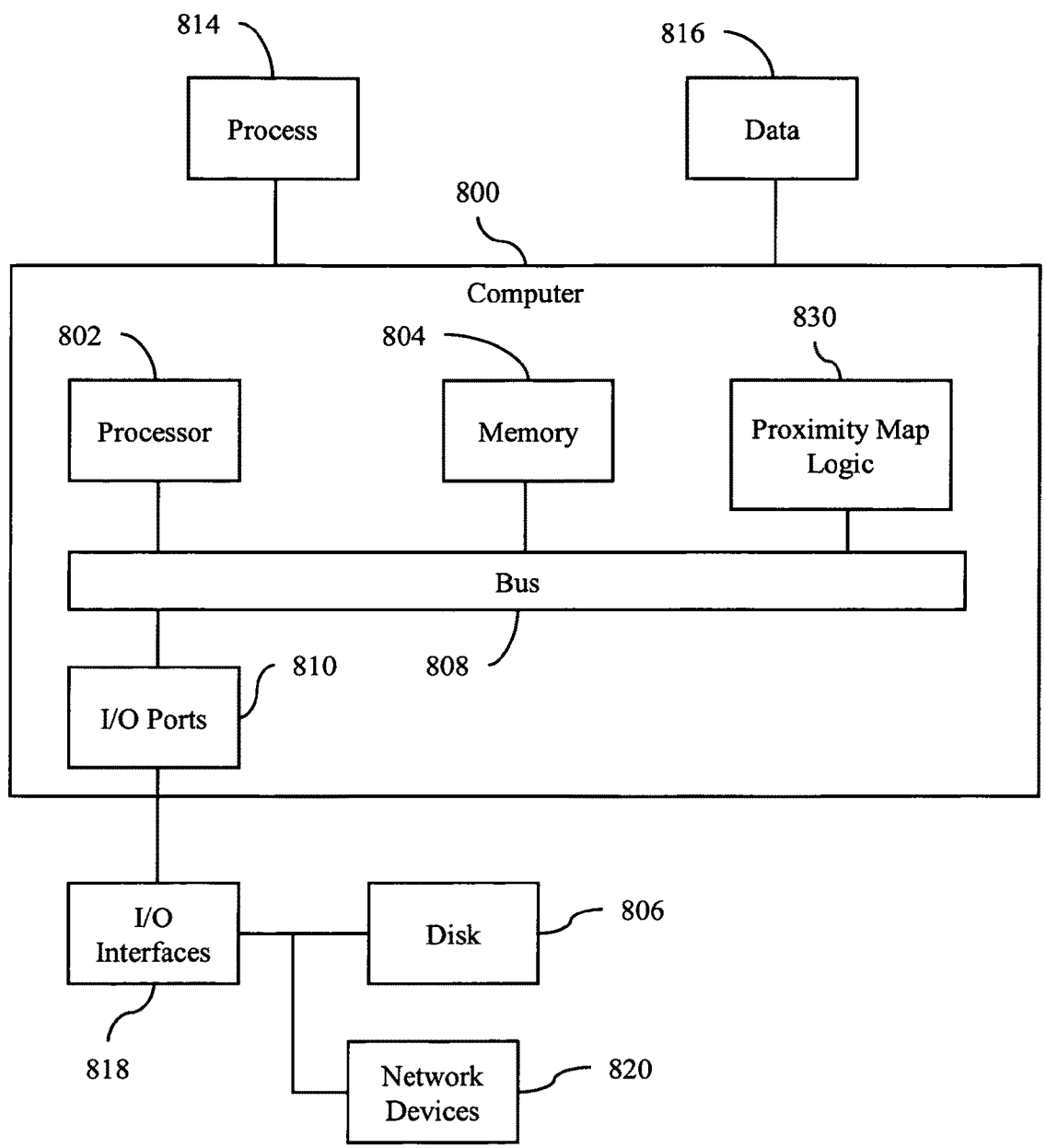
FIG. 8 illustrates an example computing environment in which example systems and methods, and equivalents, may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a proximity map logic 830 configured to facilitate providing a proximity map of correlated load metrics associated with cluster elements. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802. Thus, logic 830 may provide means (e.g., hardware, software, firmware) for acquiring load data from related nodes in a cluster. The means may include, for example, listener objects, pipes, threads, data structures, and so on, associated with acquiring data from distributed yet related locations. The means may be implemented, for example, as an ASIC. The means may also be implemented as computer executable instructions that are presented to computer 800 as data 816 that are temporarily stored in memory 804 and then executed by processor 802.

Logic 830 may also provide means (e.g., hardware, software, firmware) for computing a set of states for nodes in the cluster and for computing a set of correlations between nodes in the cluster. The computing may be performed, for example, by a circuit, by executable instructions, by combinations thereof, and so on. In one example, a member of the set of correlations may depend on a defined correlation (e.g., user-defined correlation) and/or a discovered load correlation. Logic 830 may also provide means (e.g., hardware, software, firmware) for displaying a proximity map of correlated metrics. The locations at which representations of metrics data are displayed may depend, at least in part, on the set of correlations.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
   identifying load-related data for a first set of cluster elements associated with a first user, a first service, a first resource, or a first customer, and, for each cluster element in the first set of cluster elements:
      for a selected cluster element, determining a cluster element load state based on load-related data associated with the selected cluster element;
      for a remainder of cluster elements in the first set, determining a cluster element load state based on load-related data associated with the remainder of cluster elements;
      determining a relationship of the first cluster element load state to cluster element load states of the remainder of cluster elements;
      identifying a location on a proximity display at which a cluster element metric representation for the selected cluster element is to be displayed, where the location depends, at least in part, on the relationship of the selected cluster element load state to the cluster element load states of the remainder of cluster elements;
   computing a first logical center for displaying cluster element metric representations of the first set of cluster elements on the proximity display; displaying, proximate to the first logical center, respective cluster element metric representations for respective cluster elements at respective identified locations on the proximity display;
   identifying load-related data for a second set of cluster elements associated with a second user, a second service, a second resource, or a second customer, and, for each cluster element in the first set of cluster elements:
      for a selected cluster element, determining a cluster element load state based on load-related data associated with the selected cluster element;
      for a remainder of cluster elements in the set, determining a cluster element load state based on load-related data associated with the remainder of cluster elements;
      determining a relationship of the selected cluster element load state to cluster element load states of the remainder of cluster elements;
      identifying a location on a proximity display at which a cluster element metric representation for the selected cluster element is to be displayed, where the location depends, at least in part, on the relationship of the selected cluster element load state to the cluster element load states of the remainder of cluster elements;
   computing a second logical center for displaying cluster element metric representations of the second set of cluster elements on the proximity display; and
   displaying, proximate to the second logical center, respective cluster element metric representations for respective cluster elements at respective identified locations on the proximity display.

2. The computer-readable medium of claim 1, where the first cluster element is one of, a processor, a memory, a disk, a connection, and a queue.

3. The computer-readable medium of claim 1, where the method includes storing sets of load-related data in a dependency graph, where a node in the dependency graph stores load-related data from an individual cluster element, and where a branch of nodes in the dependency graph stores load-related data from a related group of cluster elements.

4. The computer-readable medium of claim 1, where membership in the related group of cluster elements is dynamic and depends on a user specified correlation between load-related data associated with cluster elements.

5. The computer-readable medium of claim 1, where the method includes determining a subsequent selected cluster element state and refreshing the selected cluster element metric representation on the proximity display based on the subsequent selected cluster element state.

6. The computer-readable medium of claim 1, where the method includes producing a set of proximity displays and periodically displaying different members of the set of proximity displays, where members of the proximity displays are associated with one or more of, processor load, disk load, memory load, bandwidth, and queue size.

7. The computer-readable medium of claim 1, where the method includes providing a time series of proximity displays.

8. The computer-readable medium of claim 1, where the method includes displaying a previous grouping of metric representation elements in conjunction with a current grouping of metric representation elements.

9. The computer-readable medium of claim 1, where the method includes computing a logical center for the proximity display, and locating cluster element metric representations associated with cluster elements experiencing a relatively high load closer to the logical center than metric representations associated with cluster elements experiencing a relatively low load.

10. The computer-readable medium of claim 1, comprising computing a logical center of the display based, at least in part, on an amount of space available to display the proximity display, on a shape of the proximity display, on a number of cluster element metric representations to be displayed, and on a size of the cluster element metric representations to be displayed.

11. The computer-readable medium of claim 1, where the method includes receiving a drill through signal associated with a cluster element metric representation, and, in response, selectively providing a drill through display element to provide data upon which the element metric representation is based.

12. A system, comprising:
a processor;
a reader logic configured to cause the processor to acquire load-related data in real-time from two or more nodes in a cluster;
a data store to store the load-related data;
a display control logic configured to cause the processor to identify i) first load-related data from nodes associated with a first user, a first resource, or a first customer and ii) second load-related data from nodes associated with a second user, a second resource, or a second customer, the display control logic further configured to cause the processor to compute a first logical center for the first load-related data and a second logical center for the second load-related data:
a display configuration logic configured to cause the processor to determine first and second node state representations for the first and second load related data, respectively, to be displayed on a proximity display, and
where the display control logic is further configured to for each node in the first load-related data:
for a selected node, determine a load state based on load-related data associated with the selected node;
for a remainder of nodes in the first load-related data, determine a load state based on load-related data associated with the remainder of nodes;
determine a relationship of the load state of the selected node to load states of the remainder of nodes;
identify a location on a proximity display at which a first node state representation for the selected node is to be displayed, where the location depends, at least in part, on the relationship of the selected load state of the selected node to the load states of the remainder of nodes;
for each node in the second load-related data:
for a selected node, determine a load state based on load-related data associated with the selected node;
for a remainder of nodes in the second load-related data, determine a load state based on load-related data associated with the remainder of nodes;
determine a relationship of the load state of the selected node to load states of the remainder of nodes;
identify a location on a proximity display at which a second node state representation for the selected node is to be displayed, where the location depends, at least in part, on the relationship of the selected load state of the selected node to the load states of the remainder of nodes; and
display respective first and second node state representations at respective determined locations on the proximity display, such that first node state representations are displayed proximate the first logical center and second node state representations are displayed proximate the second logical center.

13. The system of claim 12, where the display configuration logic is configured to cause the processor to identify an inner region on the proximity display in which a first set of related node state representations are to be displayed.

14. The system of claim 13, where the display configuration logic is configured to cause the processor to identify an outer region on the proximity display in which a second set of related node state representations are to be displayed, where the first set of related node state representations and the second set of related node state representations are mutually exclusive.

15. The system of claim 14, where the display configuration logic is configured to cause the processor to identify a field region on the proximity display in which a third set of node state representations are to be displayed, where the first set of related node state representations, the second set of node state representations, and the third set of node state representations are mutually exclusive.

16. The system of claim 12, where the display control logic is configured to cause the processor to periodically refresh the proximity display based on re-determined node state representation locations that depend, at least in part, on re-determined node state representations.

17. A non-transitory computer-readable medium storing computer-executable instructions that when executed by a computer cause the computer to perform a method, the method comprising:
identifying load-related data for a first set of cluster elements associated with a first user, a first service, a first resource, or a first customer;
computing a first logical center for the load-related data for the first set of cluster elements;
for each cluster element in the first set of cluster elements:
for a selected cluster component, determining a first visual representation based, at least in part, on a relative load of the selected cluster component compared to other cluster components;
determining a position, proximate to the first logical center, on a proximity graph for placement of the first visual representation based, at least in part, on the relative load between the selected cluster component and the other cluster components;
identifying load-related data for a second set of cluster elements associated with a second user, a second service, a second resource, or a second customer;
computing a second logical center for the load-related data for the second set of cluster elements;
for each cluster element in the second set of cluster elements:
for a selected cluster component, determining a second visual representation based, at least in part, on a relative load of the selected cluster component compared to other cluster components;

determining a position, proximate the second logical center, on the proximity graph for placement of the second visual representation based, at least in part, on the relative load between the selected cluster component and the other cluster components; and displaying the proximity graph.

18. The computer-readable medium of claim 17 where the instructions comprise determining a position on a proximity graph for placement of the first visual representation based on a relative load between the selected cluster component and the remainder of cluster components.

19. The computer-readable medium of claim 17 where the instructions comprise determining a position on a proximity graph for placement of the first visual representation based on a topological relationship between the selected cluster component and the other cluster components.

20. The computer-readable medium of claim 17, where the instructions comprise computing a logical center for the proximity display, where the logical center will be the location at which visual representations associated with a greatest load are to be displayed.

* * * * *

UNITED STATES PATENT AND TRADEMARK OFFICE
CERTIFICATE OF CORRECTION

PATENT NO. : 8,549,002 B2  Page 1 of 1
APPLICATION NO. : 12/152535
DATED : October 1, 2013
INVENTOR(S) : Herter et al.

It is certified that error appears in the above-identified patent and that said Letters Patent is hereby corrected as shown below:

In the Specification

Column 7, line 56, delete "soon." and insert -- so on. --, therefor.

In the Claims

Column 17, line 42, in Claim 12, delete "data:" and insert -- data; --, therefor.

Column 17, line 47, in Claim 12, delete "to" and insert -- to: --, therefor.

Signed and Sealed this
Eighteenth Day of February, 2014

Michelle K. Lee
*Deputy Director of the United States Patent and Trademark Office*